United States Patent [19]

Murphy et al.

[11] Patent Number: 5,380,502
[45] Date of Patent: Jan. 10, 1995

[54] SYSTEM FOR SUSPENDING REACTOR TUBES IN A REACTOR

[75] Inventors: Timothy J. Murphy, Orange Park, Fla.; Guy A. Maakad, Jr., Custer, Wash.

[73] Assignee: Atlantic Richfield Company, Los Angeles, Calif.

[21] Appl. No.: 96,283

[22] Filed: Jul. 26, 1993

[51] Int. Cl.⁶ .............................................. B01J 19/24
[52] U.S. Cl. ..................................... 422/197; 165/82; 248/58; 248/59; 248/613; 248/901; 422/310; 422/311
[58] Field of Search ................... 248/58, 59, 613, 901; 165/82; 422/310, 312, 197

[56] References Cited

U.S. PATENT DOCUMENTS

| | | | |
|---|---|---|---|
| 2,361,020 | 10/1944 | Gibb | 248/58 |
| 2,636,351 | 4/1953 | Broors | 248/58 X |
| 2,708,686 | 5/1955 | Bernard, Jr. et al. | 248/58 |
| 2,876,975 | 3/1959 | Short | 248/58 |
| 3,768,980 | 10/1973 | Anderson | 248/58 X |
| 3,769,774 | 11/1973 | Barnes | 248/58 X |
| 4,681,294 | 7/1987 | Soltysiak | 248/59 X |

Primary Examiner—Robert J. Warden
Assistant Examiner—Amalia L. Santiago
Attorney, Agent, or Firm—Drude Faulconer

[57] ABSTRACT

A spring-biased system for suspending a reactor tube in a reactor (e.g. a hydrogen reforming furnace) which allows the tension in each reactor tube to be easily monitored while the reactor is in operation. The suspension system includes high precision springs, the compression of which is adjusted to pre-tension a respective reactor tube so that abnormal expansion of that tube during heat-up will be readily apparent from any change in length (i.e. compression) of the springs.

9 Claims, 3 Drawing Sheets

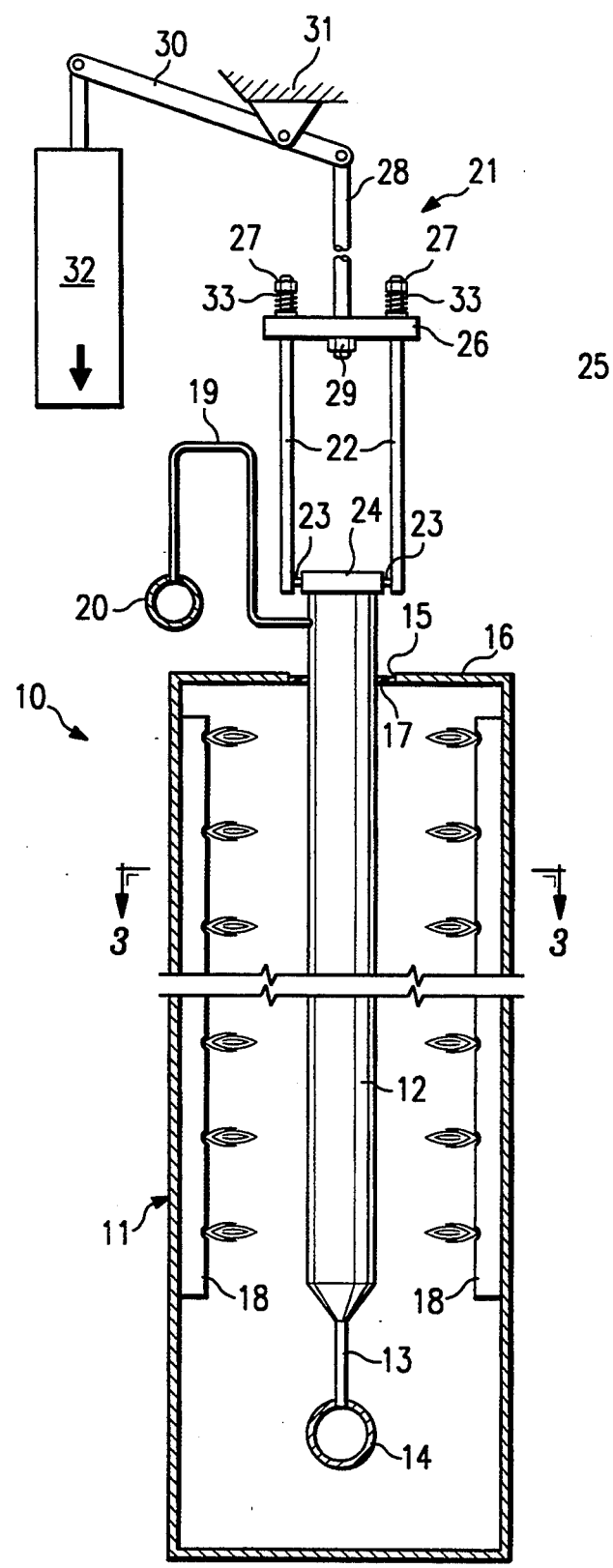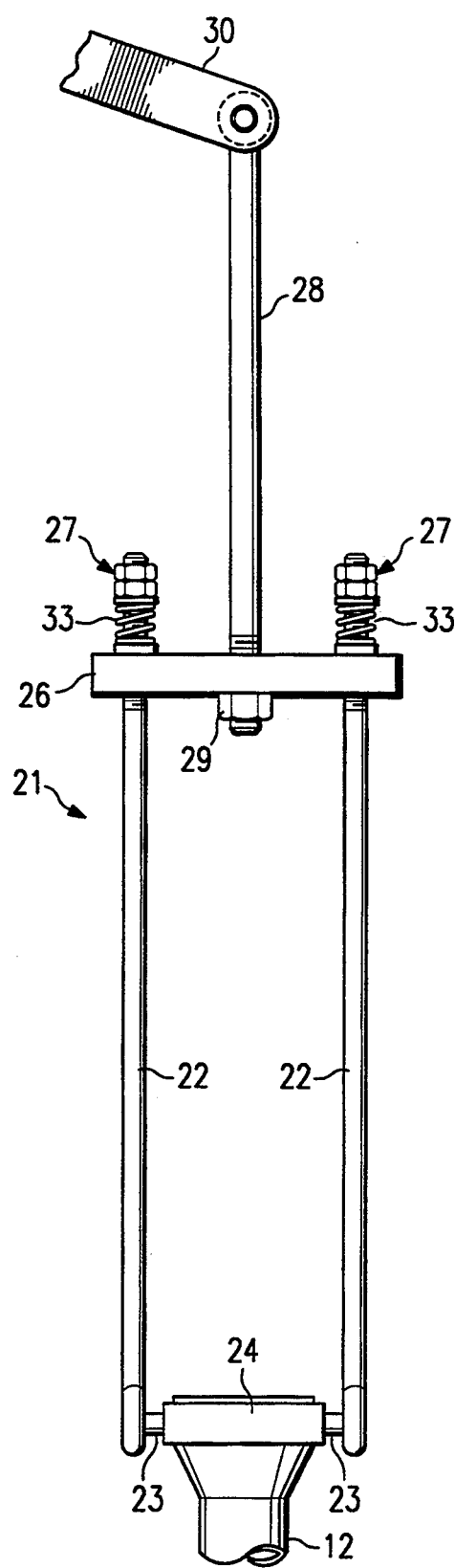
FIG. 2
FIG. 4

SYSTEM FOR SUSPENDING REACTOR TUBES IN A REACTOR

DESCRIPTION

1. Technical Field

The present invention relates to a system for suspending reactor tubes in a reactor and in one of its aspects relates to spring-loaded hanger for suspending catalyst-filled tubes in the firebox of a reforming furnace whereby any malfunction in the normal expansion of said tubes may be readily monitored.

2. Background Art

Reactors (e.g. hydrogen reforming furnaces) used in producing certain products (e.g. hydrogen from methane and steam) are unique in that the reactants (e.g. methane and steam) must be exposed to extremely high temperatures (e.g. 1760° F.) in the presence of an appropriate catalyst. Typically, this is accomplished by passing the reactants through a catalyst-filled reactor tube which, in turn, is positioned within a firebox of a large box heater. Each firebox normally contains a large number of these tubes which are connected for parallel flow. Since the length (e.g. 45 feet) of each of these catalyst-filled reactor tubes will increase substantially (up to 1.5 feet) during the heat-up cycle of the reactor, each tube must be free to expand axially along its length in order to prevent possible damage to the tube and/or its related plumbing.

In known reactors of this type, this problem is addressed by suspending each of the reactor tubes within the firebox of the heater from a counter-balanced, hanger system so that each tube is free to expand as it heats up. The lower "pigtail" (i.e. outlet conduit) of each tube is connected to and supports a common, outlet manifold or header, which is also free to "float" within the lower portion of the firebox. The upper pigtail (i.e. inlet conduit) is made flexible so that it can compensate for the expected expansion of the tube.

A typical system which supports or suspends each catalyst-filled, reactor tube and its related plumbing includes a pair of hanger rods having their lower ends connected to the tube and their upper ends passing through holes in a spreader bar or yoke. A support rod connects the yoke to one end of a lever arm, which, in turn, is pivotably connected to a fixed surface above the reactor. A counterweight is suspended from the other end of the lever arm and is sized to effectively balance the weight of (a) the catalyst-filled tube, (b) the lower pigtail, (c) a proportional share of the "floating" manifold, (d) approximately one-half of the upper pigtail, and (e) the hanger system, itself.

Because each tube and its lower pigtail must operate at extremely high temperatures during the reforming operation, their support is critical. That is, if either a tube or its lower pigtail becomes overloaded in either compression or tension, one or both are likely to fail under the high pressures and temperatures required in the reforming operation.

Insuring that a reactor tube and its related plumbing is adequately supported during the reforming operation is very difficult in presently known reactors. As the heat-up cycle takes place, the tubes, pigtails, and headers (i.e. manifolds) all change dramatically. The design of the reactor has to take into account the changes in dimensions in all three axes of movement. The mechanical support system (e.g. lever arm, hanger rods, and yokes) have to be strong enough to support a substantial weight (e.g. over a ton of dead weight) but still must be sensitive enough to compensate for the minute changes as they occur in the tubes, pigtails, and the headers. As with most mechanical systems of this type, these two critical requirements tend to work against each other.

In the prior art reactors, the reactor tubes are pre-tensioned by threading nuts onto the hanger rod above the yoke to thereby adjust the lengths of the hanger rods which extend through the yoke. This adjustment must be made when the heater is down and cold. Unfortunately, as the heater heats up, the tubes expand and change in unpredictable ways and once the heater is at its operating temperature, the hangers cannot be adjusted for fear of adversely altering the tension in the tube. Further, once the reactor is at its operating temperature, the hanger rods cannot be adjusted on-line.

Presently, there are no known ways to detect or monitor exactly how much tension or compression each tube assembly may be experiencing once the heating cycle has begun. This is further complicated by the fact that most reforming operations, once up to operating temperatures, are carried out for long, uninterrupted periods of time (e.g. two years) before the furnace is cooled down and the tubes and their related plumbing inside the firebox can be inspected. It is this problem which is addressed by the present invention.

SUMMARY OF THE INVENTION

The present invention provides a spring-biased, suspension system which allows any change in the tension in each reactor tubes of a reactor (e.g. a hydrogen reforming furnace) to be easily monitored and detected while the reactor is in operation. Each reactor tube is suspended in the reactor by a novel suspension system which is similar to prior art systems except it includes high precision springs which provide an indication of abnormal expansion of the tube during heat-up and/or operation of the reactor. If a tube expands (i.e. extends longitudinally) in the expected manner, there will be substantially no change in the length (i.e. compression) of the springs. However, any abnormal expansion of the tube during heating which might result in overloading the tube in either tension or compression is quickly indicated by a change in the length (i.e. compression) of the springs.

More specifically, each reactor tube is suspended in the firebox of the reactor by a suspension system which comprises of a pair of hanger rods which are connected at their lower ends to the top of a reactor tube. The upper ends of hanger rods extend through holes in a yoke and nuts or retainers are threaded onto the rods above the upper surface of yoke to provide a slidable connection therebetween. A support rod connects the yoke to one end of lever arm which, in turn, is pivotably mounted on a fixed support above the reactor. A counterweight is suspended from the other end of lever arm and is sized to effectively balance the combined weight of the reactor tube when filled with catalyst and its related plumbing (i.e. inlet, outlet, manifold, etc.) and the suspension system, itself.

The structure described to this point is basically the same as that found in several, prior art, hydrogen reforming furnaces wherein similar counter-balanced, suspension systems are used to suspend catalyst-filled tubes in a firebox of the furnace. In all known, prior art furnaces, however, each reactor tube is pre-tensioned while the reactor is cold by merely adjusting the threaded nuts on the upper ends of the hanger rods above the yoke. This adjustment, however, is incapable of providing any indication or warning of a tube becoming overloaded in tension or compression during heating. Also, once a furnace reaches its operating temperature, e.g. 1760° F., it routinely operates for prolonged periods of time (e.g. two years or more) before it is cooled down. During this time, the condition of the tubes and their related plumbing in the firebox can not be observed.

The present invention allows any change in tension (plus or minus) in a particular tube to be continuously monitored by positioning a precision-machined spring on each hanger rod above the upper surface of yoke to normally bias the rods upward from the yoke. When the furnace is cold, the retainers on the hanger rods are adjusted to partially compress the springs thereby pre-tensioning the tube. Once all of tubes are properly pre-tensioned, the height of each spring is accurately measured and recorded. As the furnace heats up, any abnormal changes in the expansion of a particular tube will be reflected in a change in the compression (i.e. length) of its respective springs.

By a simple comparsion of the new lengths of these springs to their original measured lengths, it can easily be deduced whether there has been any change in the tension of tube from its pre-tensioned value and whether or not any corrective action is required. The springs provide a valuable tool in continuously evaluating the condition of the tubes and their related plumbing during the normal extended periods of operation.

BRIEF DESCRIPTION OF THE DRAWINGS

The actual construction, operation, and apparent advantages of the present invention will be better understood by referring to the drawings in which like numerals identify like parts and in which:

FIG. 2 is a cross-sectional view of a reactor having the present invention incorporated therein;

FIG. 4 is an elevational view of a suspension system of the present invention for suspending a single reactor tube;

BEST KNOWN MODE FOR CARRYING OUT THE INVENTION

Figure 1:
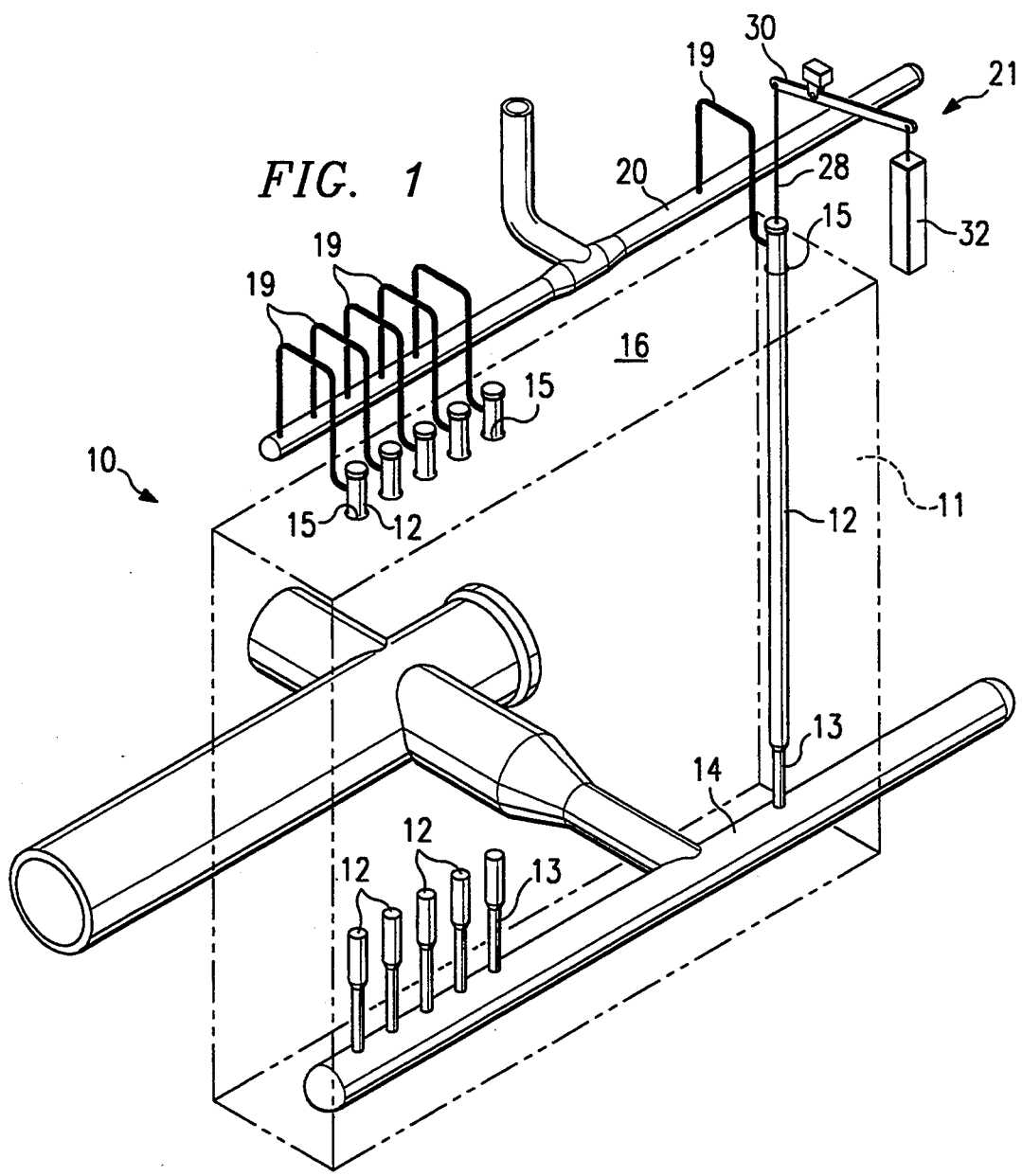
FIG. 1 is a perspective view, partly broken away, of a typical reactor of the type in which the present invention is to be incorporated.
Figure 3:
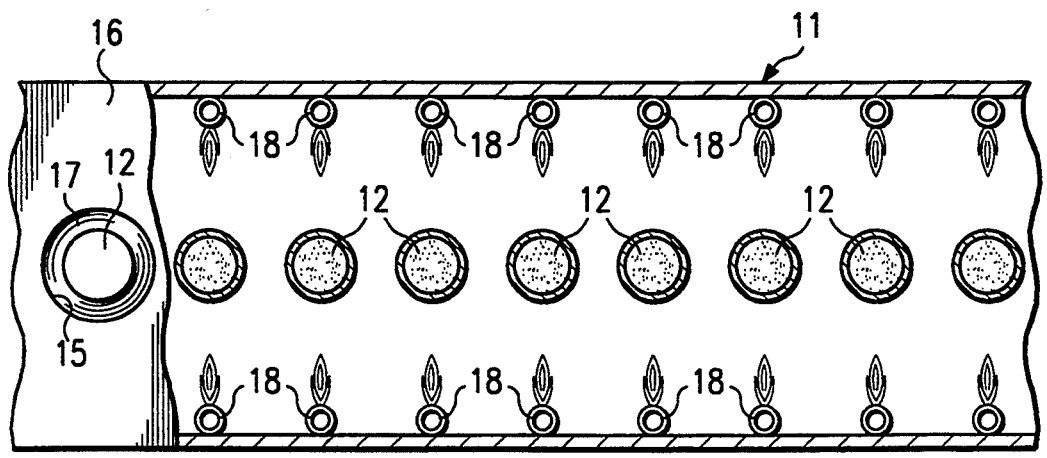
FIG. 3 is a sectional view taken along line 3—3 in FIG. 2.
Figure 5:
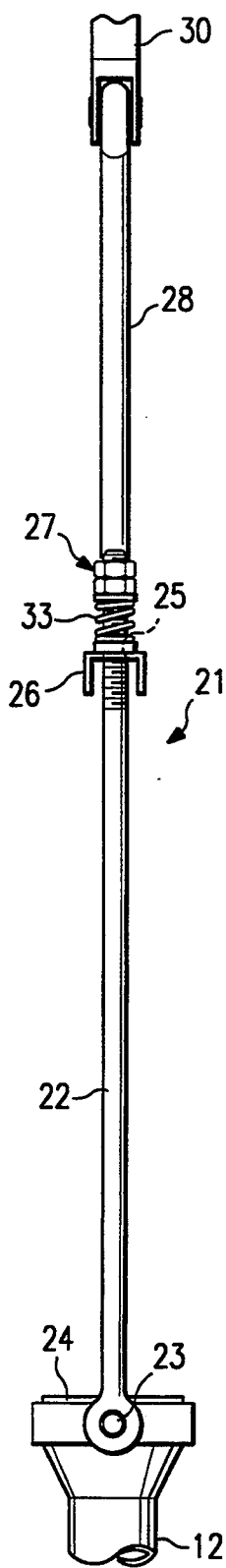
FIG. 5 is a side view of the single tube suspension system of FIG. 4.

Referring more particularly to the drawings, FIGS. 1–5 illustrate the present invention in relation to a typical reactor in which the invention may be used. One such reactor may be a hydrogen reforming furnace in which methane and steam are combined in the presence of an appropriate catalyst at extremely high temperatures to produce hydrogen gas. As illustrated, reactor 10 comprises a large box heater which has a firebox 11 in which a plurality (e.g. 68 or more) of reactor tubes 12 are aligned between rows of burner tubes 18 (shown in FIGS. 2 and 3). Each of tubes 12 are to be filled with a catalyst which is appropriate for the operation to be conducted. While obviously the dimensions of the tubes may vary, typical dimensions for a tube used in a hydrogen reforming furnace are: 45 feet long, $4\frac{3}{8}$ inches in inside diameter, and approximately 0.6 inches in wall thickness.

A lower pigtail 13 (i.e. outlet) extends from the lower end of each tube 12 and is connected to a common lower header or manifold 14. The upper end of each tube 12 extends upward through its respective opening 15 in tube sheet 16 which covers the top of firebox 11. Insulation 17 or the like is positioned within each opening 15 and around tube 12 to effectively reduce heat loss from firebox 11 but still allows sliding movement of tube 12 therethrough whereby tube 12 is free to expanded longitudinally through said opening when heated. An upper pigtail 19 (e.g. inlet) is connected between each tube 12 and an upper header 20 to supply reactants from upper header 20 to each of the tubes 12. Each upper pigtail 19 is flexible and is designed to compensate for the expected longitudinal expansion of tubes 12.

Each tube 12 is suspended in firebox 11 by a suspension system 21 which, in turn, comprises a pair of hanger rods 22; the lower ends of which are pivotably connected respectively to diametrically-opposed ears 23 on flange 24 which, in turn, is secured to the top of tube 12 (FIG. 2). The upper ends of hanger rods 22 slidably extend through openings 25 in a spacer bar or yoke 26. Nuts or retainers 27 are threaded or otherwise secured to the upper ends of rods 22 above the upper surface of yoke 26 to provide a slidable connection therebetween.

The lower end of support rod 28 passes through an centralized opening in yoke 26 and has a nut 29 or the like secured thereto below the bottom surface of yoke 26. The upper end of support rod 28 is pivotably connected to one end of a lever arm 30 which, in turn, is pivotably mounted on a fixed support 31 above reactor 10. A counterweight 32 is suspended from the other end of lever arm 30 and is sized to effectively balance the combined weight of (a) the catalyst-filled tube 12, (b) the lower pigtail 13 and a proportional share of "floating" manifold 14; (c) approximately one-half of upper pigtail 19; and (d) suspension system 21. As will be recognized by those skilled in the art, these weights may be substantial; e.g. a reinforced concrete block $1\frac{1}{4}$ foot by $1\theta$ foot by $5+$ feet and weighing over 1300 pounds.

The structure of reactor 10 as described up to this point is the same as that found in several, well known, hydrogen reforming furnaces wherein a counter-balanced, suspension system such as that described above is used to suspend catalyst-filled tubes in a firebox of a heater. In all of these known, prior art furnaces, each tube 12 is pre-tensioned in a defined manner by merely threading nuts 27 onto cooperating threads on the upper ends of rods 22 to thereby adjust the lengths of rods 22 below yoke 26. This adjustment must be made while the furnace is down and cold.

Unfortunately, as the furnace heats ups, the tubes 12 begin to expand longitudinally and change in unpredictable ways. Once the furnace is at its operating temperature, the suspension system 21 (i.e. hanger rods 12) cannot be adjusted for fear of altering the tension in the tube to an undesirable value. Also, once firebox 11 reaches its operating temperature, e.g. 1760° F., the reformina operation will not normally be stopped nor will the firebox be opened for approximately 2 years.

During this time, the tension (or compression) in tubes 12 and their related plumbing, and hence their condition, can not be observed nor determined.

In accordance with the present invention, any change in the preset tension of a particular tube 12 can be continuously monitored during operation of the furnace thereby alerting an operator to any malfunction which might ultimately result in an overload (hence possible failure) of a particular tube 12 or its related plumbing. This monitoring capability of the present suspension system results from positioning precision-machined springs 33 onto the upper end of each hanger rod 22 between retainer 27 on the rod and the upper surface of yoke 26 to thereby bias the rods 22 upward from the upper surface of yoke 26.

When the furnace is cold, each tube 12 is precisely pre-tensioned by adjusting retainers (i.e. threading nuts 27 onto rods 22) to partially compress springs 33. Once all of tubes 12 are properly tensioned, the height of each spring 33 is accurately measured and recorded to provide necessary baseline-loading reference measurements. As the furnace heats up and reactants are introduced into tubes 12 through upper pigtails 19, any abnormal change in the expected longitudinal expansion of a particular tube 12 (i.e. a change in tension in that tube) which might result in the overloading of that tube will be reflected by a change in the length (i.e. compression) of springs 33. By a simple comparison of the new lengths of particular springs 33 to their original, baseline reference measurements, any change in the tension in that tube can easily be deduced as the change occurs. It should be recognized that springs 33 provide a valuable tool in evaluating the condition of the furnace, tubes 12 and their related plumbing during heating and the prolonged periods of operation (e.g. two years) between routine cool downs for inspection and maintenance of the reactor.

Figure 6:
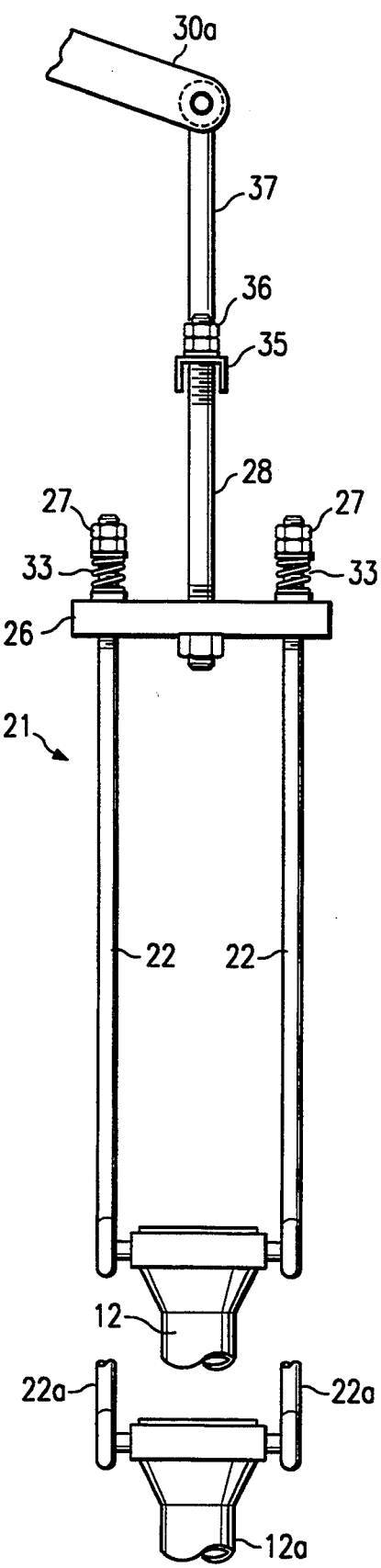
FIG. 6 is an elevational view of a suspension system of the present invention for suspending two reactor tubes.
Figure 7:
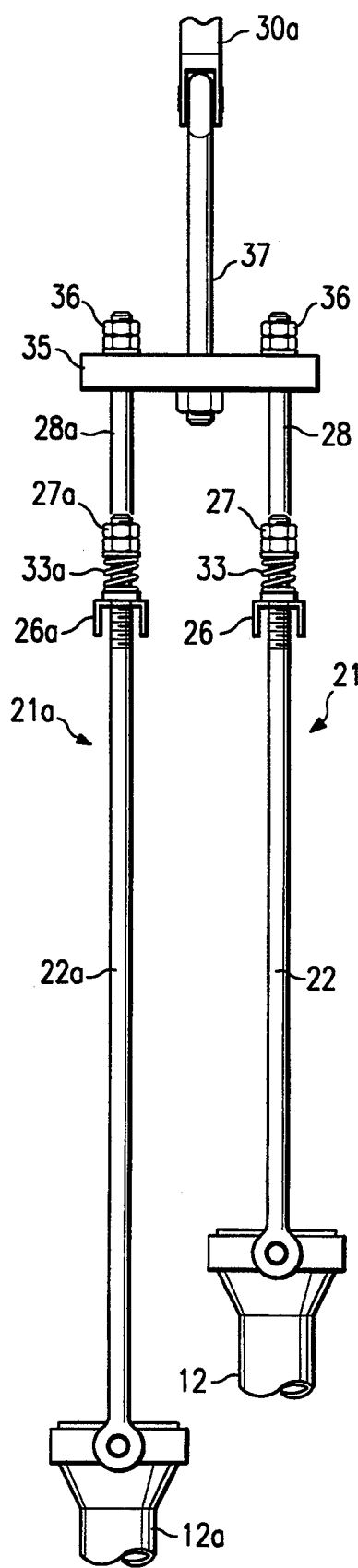
FIG. 7 is a side view of the double tube suspension system of FIG. 5.

The suspension system 21 described above is one specifically designed for suspending a single reactor tube 12 within a firebox of a reactor. FIGS. 6 and 7 illustrate a further embodiment of the present invention which is similar to that described above but suspension system 21a is capable of using a single counterweight (e.g. 32) to suspend and support two reactor tubes, 21 and 21a, which lie adjacent to each other in a firebox. Referring now to FIGS. 6 and 7, the construction of the hanger assembly, (i.e. hanger rods, yoke, etc.) which suspend first tube 12 is basically identical to that described above and will not be repeated here for the sake of brevity. The second hanger assembly 21a which suspends a second reactor tube 21a is also similar to assembly 21 in that assembly 21a comprises a pair of hanger rods 22a which are connected at their lower ends to ears 23a on the upper end of tube 12a. The upper ends of hanger rods 22a pass through respective openings in second yoke 26a and have springs 33a positioned thereon between the upper surface of second yoke 26a and retainers 27a which are threaded onto rods 22a.

A second support rod 28a is connected to second yoke 26a and extends upward substantially parallel to first support rod 28. The upper ends of both support rods pass through respective openings through spacer bar 35 and each has a nut 36 threaded thereon. A suspension rod 37 connects spacer bar 35 to one end of a pivoted lever arm 30a which, in turn, has a single counterweight (not shown) suspended from its other end similarly as described above.

It will be noted that as illustrated, tube 12 is shown as being elevated with respect to tube 12a. This is required in some furnaces where the reactor tubes 12 are positioned as close as possible to each other in order to get the maximum number of reactor tubes in a particular size firebox. Accordingly, all the tubes could be on the same level if space permits.

What is claimed is:

1. In a reactor having a firebox; a heater for heating said firebox; a plurality of reactor tubes adapted to be filled with a catalyst extending downward into said firebox; a lower manifold in said firebox; an outlet attached to the lower end of each of said reactor tubes connected to and supporting said lower manifold; a header for supplying reactants to said reactor tubes; a flexible inlet fluidly connecting each of said reactor tubes to said header; and a plurality of suspension systems for suspending said reactor tubes in said firebox, wherein each of said systems comprise a pair of hanger rods, each hanger rod having a lower end and an upper end, said lower end of each hanger rod attached at diametrically-opposed points to the upper end of a respective reactor tube; a yoke having a pair of spaced openings therethrough, said upper end of each rod slidably positioned through a respective opening in said yoke; a retainer on said upper end of each of said rods above the upper surface of said yoke; a support rod having an upper and lower end, said lower end attached to said yoke; a lever pivotably mounted on a fixed support, said upper end of said support rod attached to one end of said lever; and a weight suspended from the other end of said lever; the improvement comprising in each of said plurality of suspension systems;

a spring positioned on each of said hanger rods between said yoke and said retainer which normally biases said retainer upward from said yoke.

2. The reactor of claim 1 wherein said improvement includes:

means for adjusting the compression of said springs.

3. The reactor of claim 2 wherein said means for adjusting the compression of said springs comprises:

cooperating threads on said retainers and their respective upper ends of said hanger rods.

4. A system for suspending reactor tubes in a furnace, said mechanism comprising:

a pair of hanger rods, each hanger rod having a lower end and an upper end, said lower end of each hanger rod attached at diametrically-opposed points to the upper end of a reactor tube;

a yoke having a pair of spaced openings therethrough, said upper end of each rod slidably positioned through a respective opening in said yoke;

a retainer on said upper end of each of said rods above the upper surface of said yoke;

a spring positioned on each rod between said yoke and said retainer which normally biases said retainer upward from said yoke;

a support rod having an upper and lower end, said lower end attached to said yoke;

a lever pivotably mounted on a fixed support, said upper end of said support rod attached to one end of said lever; and a weight suspended from the other end of said lever.

5. The suspension system of claim 4 including:

means for adjusting the compression of said springs.

6. The suspension system of claim 5 wherein said means for adjusting the compression of said springs comprises:

cooperating threads on said retainers and on the respective upper ends of said hanger rods.

7. A reactor comprising:
a firebox;
a heater for heating said firebox;
a plurality of reactor tubes adapted to be filled with a catalyst extending downward into said firebox;
a lower manifold in said firebox;
an outlet attached to the lower end of each of said reactor tubes connected to and supporting said lower manifold;
a header for supplying reactants to said reactor tubes;
a flexible inlet fluidly connecting each of said reactor tubes to said header; and
a plurality of suspension systems for suspending said reactor tubes in said firebox, each said system comprising;
a first pair of hanger rods, each hanger rod having a lower end and an upper end, said lower end or each hanger rod attached at diametrically-opposed points to the upper end of a first reactor tube;
a first yoke having a pair of spaced openings therethrough, said upper end of each rod slidably positioned through a respective opening in said yoke;
a first retainer on said upper end of each of said rods above the upper surface of said yoke; each of said retainers and the upper end of each of said respective hanger rods having cooperating threads for adjusting said retainers on said hanger rods;
a first spring positioned on each of said rods between said first yoke and said retainer which normally biases said retainer upward from said yoke;
a first support rod having an upper and lower end, said lower end attached to said yoke;
a second pair of hanger rods, each of said second hanger rods having a lower end and an upper end, said lower end of each second hanger rod attached at diametrically-opposed points to the upper end of a second reactor tube;
a second yoke having a pair of spaced openings therethrough, said upper end of each said second hanger rod slidably positioned through a respective opening in said second yoke;
a second retainer on said upper end of each of said second hanger rods above the upper surface of said second yoke;
a second spring positioned on each said second hanger rods between said second yoke and said second retainer which normally biases said second retainer upward from said second yoke;
a second support rod having an upper and lower end, said lower end attached to said second yoke;
a spacer bar attached to the upper ends of each of said first and said second support rods;
a lever pivotably mounted on a fixed support;
a suspension rod having a lower end attached to said spacer bar and an upper end attached to said one end of said lever; and
a weight suspended from another end of said lever.

8. A system for suspending reactor tubes in a furnace, said mechanism comprising:
a first pair of hanger rods, each hanger rod having a lower end and an upper end, said lower end of each hanger rod is adapted to be attached at diametrically-opposed points to the upper end of a first reactor tube;
a first yoke having a pair of spaced openings therethrough, said upper end of each rod slidably positioned through a respective opening in said yoke;
a retainer on said upper end of each of said rods above the upper surface of said yoke, each of said retainers and the upper end of each of said respective hanger rods having cooperating threads for adjusting said retainers on said hanger rods;
a spring positioned on each rod between said yoke and said retainer which normally biases said retainer upward from said yoke;
a first support rod having an upper and lower end, said lower end attached to said first yoke;
a second pair of hanger rods, each of said second hanger rods having a lower end and an upper end, said lower end of each second hanger rod adapted to be attached at diametrically-opposed points to the upper end of a second reactor tube;
a second yoke having a pair of spaced openings therethrough, said upper end of each said second hanger rod slidably positioned through a respective opening in said second yoke;
a second retainer on said upper end of each of said second hanger rods above the upper surface of said second yoke;
a spring positioned on each said second hanger rod between said second yoke and said second retainer which normally biases said second retainer upward from said second yoke;
a second support rod having an upper and lower end, said lower end attached to said second yoke;
a spacer bar attached to the upper ends of each of said first and second support rods;
a lever pivotably mounted on a fixed support;
a suspension rod having a lower end attached to said spacer bar and an upper end attached to said one end of said lever; and
a weight suspended from another end of said lever.

9. The suspension system of claim 8 including:
means for adjusting the compression of said springs.

* * * * *